United States Patent [19]

Malkiel

[11] 3,783,359

[45] Jan. 1, 1974

[54] BRUSHLESS D. C. MOTOR USING HALL GENERATORS FOR COMMUTATION

[75] Inventor: Saul L. Malkiel, East Orange, N.J.

[73] Assignee: The Bendix Corporation, Teterboro, N.J.

[22] Filed: Dec. 23, 1971

[21] Appl. No.: 211,519

[52] U.S. Cl. .............................. 318/254, 318/439
[51] Int. Cl. ........................................ H02k 29/00
[58] Field of Search ............................ 318/254, 439

[56] References Cited
UNITED STATES PATENTS

| | | |
|---|---|---|
| 3,678,358 | 7/1972 | Kolatorowicz ..................... 318/254 |
| 3,651,368 | 3/1972 | Hanada ............................... 318/254 |
| 3,600,658 | 8/1971 | Kuniyoshi ........................... 318/254 |

Primary Examiner—Bernard A. Gilheany
Assistant Examiner—W. E. Duncanson, Jr.
Attorney—Anthony F. Cuoco et al.

[57] ABSTRACT

A brushless motor is driven by a transistorized bridge and commutated by an arrangement of Hall generators. The motor is controlled in torque generating and constant speed modes. Pulse width modulation is applied to control the amplitude of the motor voltage and regenerative braking is applied.

9 Claims, 5 Drawing Figures

BRUSHLESS D. C. MOTOR USING HALL GENERATORS FOR COMMUTATION

BACKGROUND OF THE INVENTION

1. Field of the Invention

This invention relates generally to brushless d.c. motors and particularly to a motor of the type described which is commutated by an arrangement of Hall generators.

2. Description of the Prior Art

Heretofore there has not been an arrangement such as provided by the present invention wherein three Hall generators spaced 120 electrical degrees apart are used essentially as position sensors for commutating a motor, and which Hall generators may be disposed in the air gap of the machine so as not to increase machine size. Previous devices have used six position sensors which have operated on photoelectric or magnetic principles.

SUMMARY OF THE INVENTION

This invention contemplates a brushless d.c. motor commutated by three Hall generators disposed 120 electrical degrees apart. Control circuitry is provided for operating the motor in both torquer and speed control modes.

In the torquer mode, four-quadrant proportional operation results which, during high-speed regenerative braking, supplies power back to the motor power supply. The regenerative braking torque varies linearly with a control signal. An automatic changeover to plugging operation occurs when the back electromotive force (EMF) reduction with speed is such that motor current tends to drop.

In the speed control mode, signals from the Hall generators are used for the speed control. The frequency of these signals is compared to an accurate reference frequency and the resulting error frequency is used to control motor power.

One object of this invention is to provide a d.c. brushless motor commutated by an arrangement of Hall generators.

Another object of this invention is to provide a motor of the type described which is connected in a torquer mode, with motor current and torque proportional to a command signal.

Another object of this invention is to provide a motor of the type described which is connected in a speed control mode wherein the motor accelerates an inertial load up to a speed, and then holds that speed accurately in the face of load torque disturbances.

Another object of this invention is to use Hall generators for commutation in a manner so that they are effectively switches driven only at a high level. The commutation angles, therefore, are independent of motor torque or speed and provide good low torque and low speed performance.

Another object of this invention is to use Hall generator signals as speed control signals when the motor is operated in the speed control mode.

Another object of this invention is to provide pulse width modulation to the motor for essentially loss free proportional amplification of the motor voltage.

Another object of this invention is to provide regenerative braking.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
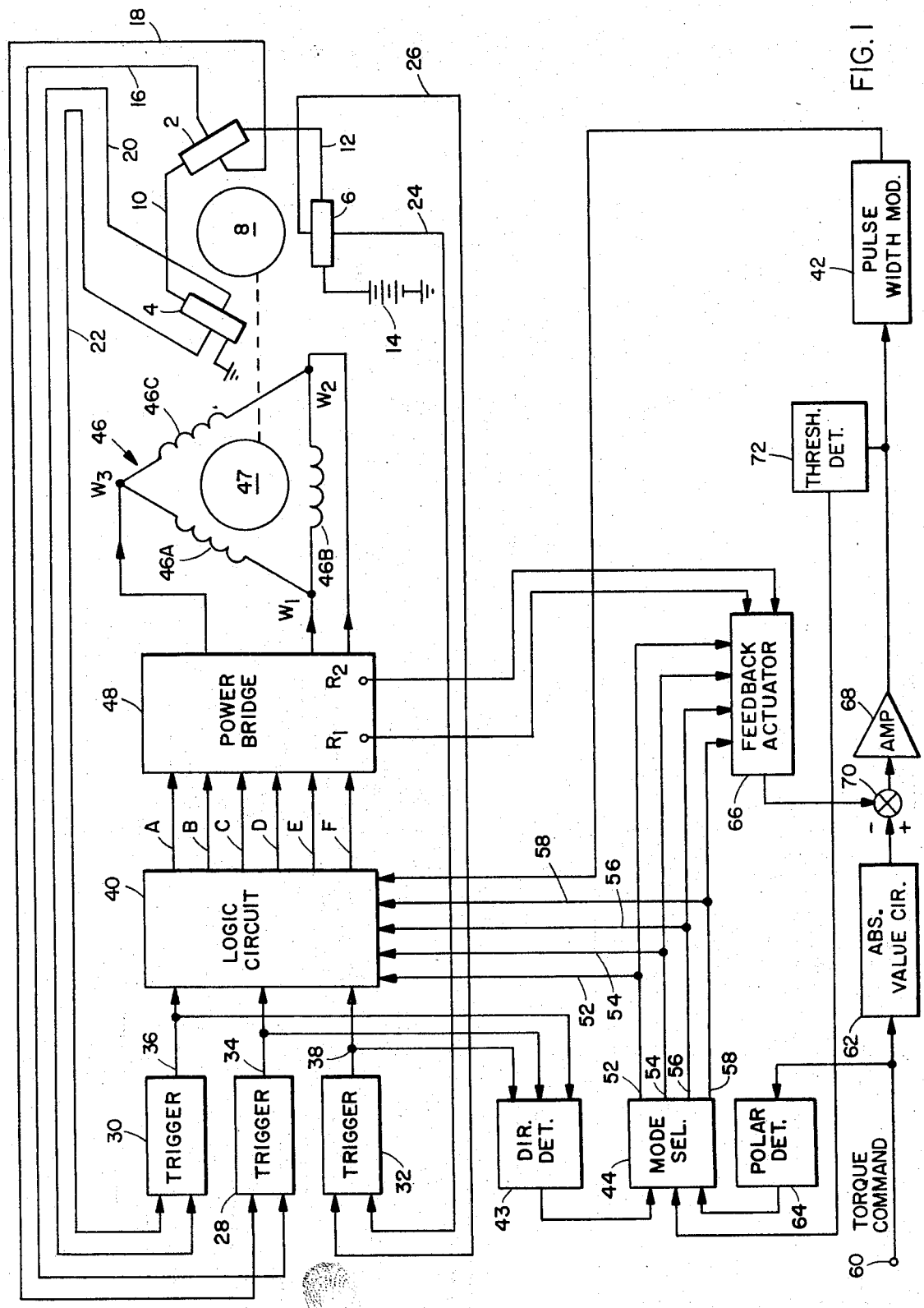
FIG. 1 is a electrical schematic-block diagram of a motor according to the invention and controlled in a torque generating mode.

FIG. 1 shows three Hall effect generators 2, 4 and 6 spaced 120 electrical degrees apart and positioned in magntic flux sensing relation with a permanent magnet rotor member 8. Hall generator 2 is connected to Hall generator 4 through a conductor 10 and to Hall generator 6 through a conductor 12. Hall generator 4 is connected to ground and Hall generator 6 is connected to a d.c. excitation source shown as a battery 14. Hall generator 2 has output conductors 16 and 18, Hall generator 4 has output conductors 20 and 22 and Hall generator 6 has output conductors 24 and 26.

Figure 2:
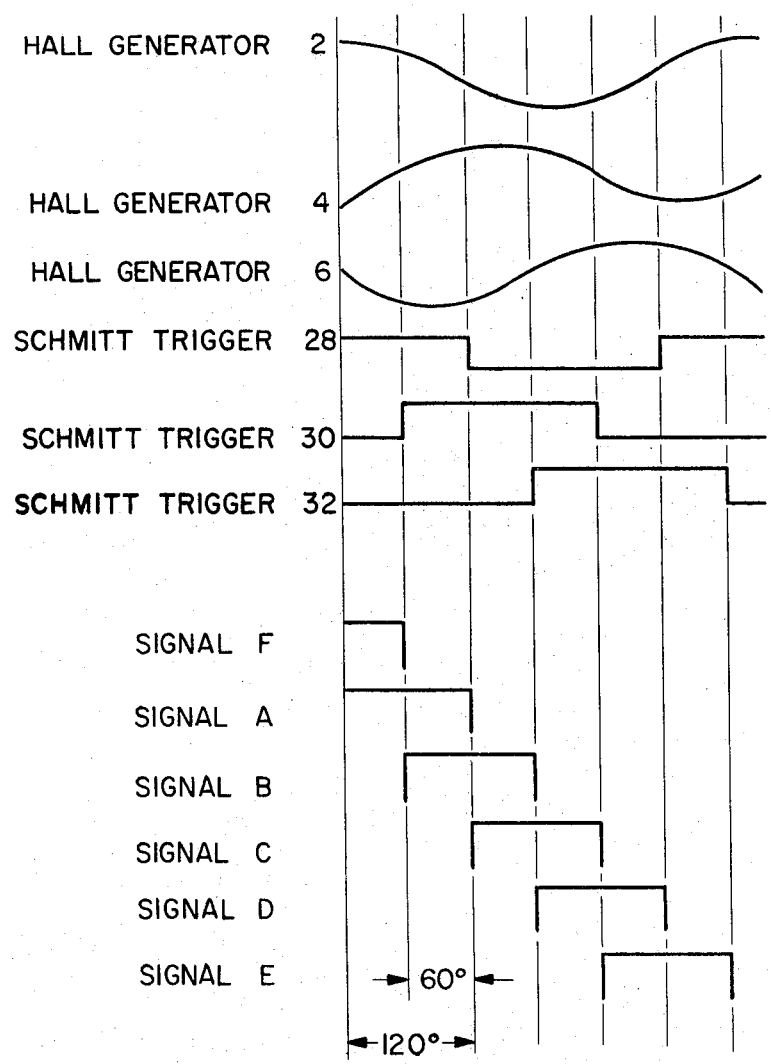
FIG. 2 is a graphical representation illustrating waveforms at various points of operation of the motor shown in FIG. 1.

Output conductors 16 and 18 of Hall generator 2 are connected to a Schmitt trigger 28. Output conductors 20 and 22 of Hall generator 4 are connected to a Schmitt trigger 30 and output conductors 24 and 26 of Hall generator 6 are connected to a Schmitt trigger 32. Hall generators 2, 4 and 6 provide at their respective output conductors a three phase sine wave signal system as shown in FIG. 2. Schmitt triggers 28, 30 and 32 sense the signals at zero and provide square wave signals with the same phase as the sine waves, and which square wave signals are also shown in FIG. 2.

The signals from Schmitt triggers 28, 30 and 32 at output conductors 34, 36 and 38 are applied to a commutation logic circuit 40 which is responsive to said signals for providing 6 signals each 120° wide and overlapping 60°. These signals are designated as A to F and have waveforms as shown in FIG. 2.

Logic circuit 40 receives a variable pulse width signal from a pulse width modulator 42 and mode selection signals from a mode selector 44. The operation of devices 42 and 44 in conjunction with logic circuit 40 will be hereinafter described, and it will suffice to presently say that the variable pulse width signal from device 42 controls the effective amplitude of the voltage applied to a motor 46 from logic circuit 40 through a power bridge 48, and the mode selection signals from device 44 control the direction of motor current as sensed by a direction detector 43, and whether the motor draws power or returns power to a supply 45 (FIG. 3), thus acting as a generator.

Signals A to F from logic circuit 40 are applied to power bridge 48 and therefrom to the three phase windings 46A, 46B, and 46C of motor 46, and which motor further includes a rotor element 47 suitably coupled to rotor 8 so that the rotors rotate together and terminals $W_1$, $W_2$ and $W_3$ connected to power bridge 48.

Figure 3:
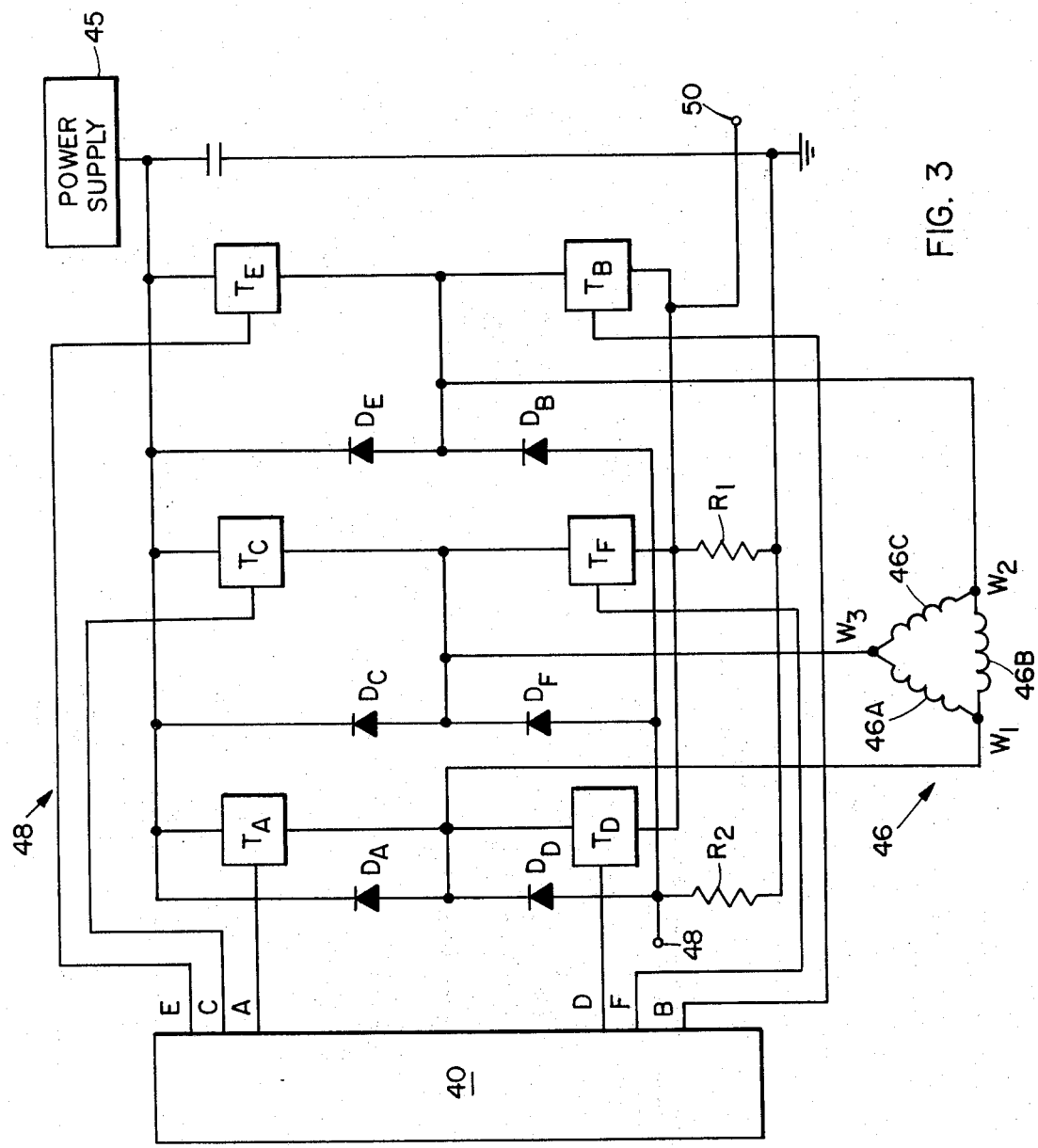
FIG. 3 is an electrical schematic-diagram of a bridge used for driving the motor, and which bridge is shown generally in FIG. 1.

With reference now to FIG. 3, signals A, B, C, D, E and F from logic circuit 40 drive transistors $T_A$, $T_B$, $T_C$, $T_D$, $T_E$, and $T_F$, respectively, in power bridge 48. Diodes $D_A$, $D_B$, $D_C$, $D_D$ and $D_F$ are connected across the respective transistors and provide a path for the inductive motor current to flow through when pulse width modulating is employed, and also form part of a path for regenerative feedback current to flow back to power supply 45 as will be hereinafter more fully explained. It is seen from the figure that terminal $W_1$, of motor 46 is connected between diodes $D_A$ and $D_D$, terminal $W_2$ is connected between diodes $D_E$ and $D_B$ and between transistors $T_C$ and $T_F$, and terminal $W_3$ is connected between diodes $D_C$ and $D_F$ and between transistors $T_B$ and $T_E$.

Two resistors are provided for measuring motor current. A resistor $R_1$ samples total motor current when the motor is driving in either direction. When regenerative braking is applied the total motor current passes through a resistor $R_2$ and a signal at a terminal 48 in a negative sense is proportional to motor current. A signal proportional to motor current when the motor is driving is provided at an output condutor 50 leading from resistor $R_1$.

Figure 4:
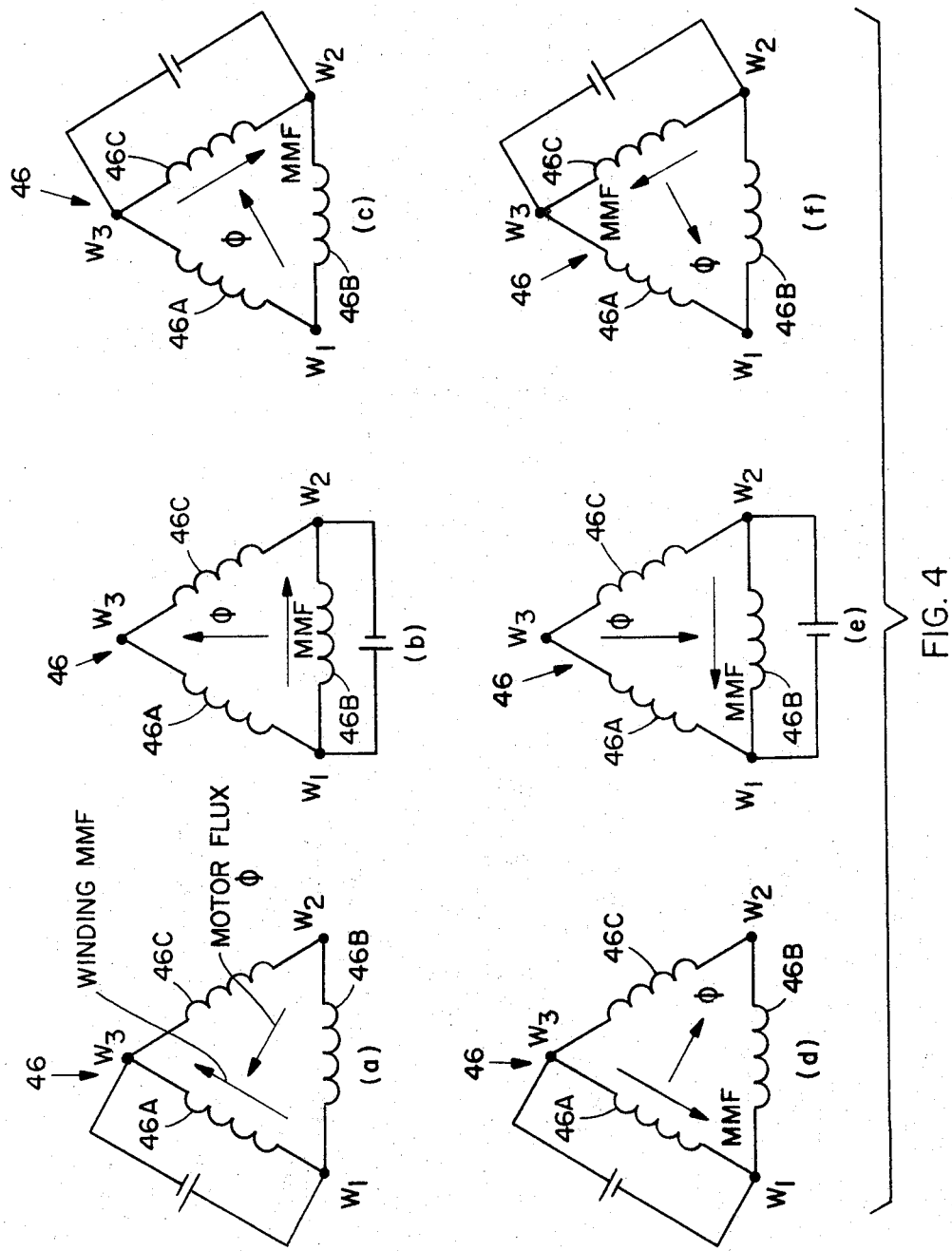
FIG. 4 is a diagrammatic representation shwoing discrete motor armature positions relative to the direction of magnetic flux.

The rotation of magnetomotive force (MMF) in synchronism with magnetic flux for motor 46 is shown in FIG. 4. The MMF does not rotate smoothly but exists in only 6 discrete directions as shown by the arrows in FIG. 4; (a), (b), (c), (d), (e) and (f). Thus the optimum 90° power angle between MMF and flux exists exactly at six points. About any of these six points the rotor will change 30 on either side and the MMF remains fixed. This gives a range of power angles from 60° to 120° which repeats six times per rotation. The effect of the power angle rotation is to give a torque loss of 15 percent at these extreme points and average torque reduction of only 4.5 percent.

Motor voltage reduction is accomplished by pulse width modulation. It is well known that if the duty cycle of the voltage application to an inductive load is varied, the average current will vary. If the pulsing frequency is sufficiently high compared to the circuit time constant, the current will contain a small percentage of ripple. Thus, an essentially lossless proportional amplification is obtained.

In the invention, the top row of transistor switches in FIG. 3; that is, switches $T_A$, $T_C$, $T_E$, will simultaneously perform the pulse width modulation function and the commutation function. Thus, only two switches will be in series with the load at one time to minimize "on" switch losses. Transistor $T_A$, for example, has a duty cycle of $n$. Load current flows through transistor $T_A$ for $n$ fraction of the time. For $(1-n)$ fraction, current flows through diode $D_D$. The net effect on the load current is the superimposition of the transistor switch and diode currents. Thus, the top row of switches receives pulse width modulated signals in addition to the commutation signals.

In regenerative braking, motor 46 acts as a generator and returns power to power supply 45. In this mode of operation, the top row of switches is disabled and pulse width signals are applied to the bottom row of switches ($T_D$, $T_F$, $T_B$ in FIG. 3) in addition to their normal commutation signals. For the fraction of the duty cycle in which $T_D$, for example, is "on," current flows through diode $D_F$, through the motor from terminals $W_3$ to $W_1$ and through $T_D$. For the remaining fraction of the duty cycle, the current flows through $D_F$, motor 46, diode $D_A$ and power supply 45. As heretofore noted, resistor $R_2$ samples the total motor current.

It will now be explained that power bridge 48, shown generally in FIG. 1 and in substantial detail in FIG. 3, can be arranged in any of four modes. Mode 1 provides positive torque at positive motor speed and mode 4 provides regenerative braking at positive speed; mode 3 provides negative torque at negative speed and may be used even when the speed is slightly positive while mode 2 provides regenerative braking at negative speed.

In mode 1, the applied motor voltage is in phase with the back EMF and terminals $W_1$ and $W_3$ of motor 46 are energized, but for other instants of time other terminals are energized so that the applied voltage is connected to the two terminals which are peaking in back EMF.

In mode 4, motor speed is momentarily unchanged and the peak of the back EMF is always connected to the circuit so that maximum current is produced. In this mode there is a return of power to supply 45.

Mode 3 is the same as mode 1, except that at any motor shaft position there is a reversal of applied voltage with respect to mode 1. Therefore, the current is reversed and causes opposite torque. Mode 2 is mode 4, except for reversed current.

The selection of the appropriate mode is made by mode selector 44 in FIG. 1. The mode selector energizes one of the four output conductors 52, 54, 56 and 58 to establish the appropriate mode.

With further reference to FIG. 1, an input d.c. torque command 60 is applied to an absolute value circuit 62 which gives a positive output numerically equal to the torque input, regardless of whether the input is positive or negative. The torque command 60 is also applied to a polarity detector 64 which provides a discrete positive output for all positive inputs and a zero output for negative inputs. Polarity detector 64 may be a conventional type Schmitt trigger. A feedback actuator circuit 66 connected to output resistors $R_1$ and $R_2$ in power bridge 48 provides feedback to a current amplifier 68. The appropriate output from feedback selector 66 is selected by the signals from mode selector 44 at output conductors 52, 54, 56 and 58.

Amplifier 68 amplifies the difference between the signal from absolute value circuit 62 and the signal from feedback actuator 66 as provided by a summing means 70. The output from amplifier 68 is applied to pulse width modulator 42 and therefrom to logic circuit 40.

Pulse width modulator 42 provides a pulse output, and which pulses have a with proportional to the output of amplifier 68. In operation, a torque command will cause a proportional motor current to flow and torque will be generated. If the torque command is suddenly reversed while the motor speed is still positive, for example, mode selector 44 will sense that the torque command and speed are of opposite polarity and will set up the aforenoted mode 4. As long as amplifier 68 operates in its linear range, required current is being developed. If the current drops to below that which is commanded, a threshold detector 72, connected at its input to amplifier 68 and at its output to mode selector 44, will sense that amplifier 68 is saturated and will signal mode selector 44 to change to mode 3. If, at any time, the actual current exceeds that commanded, threshold detector 72 will sense this and signal the mode selector to return to mode 4. In this way mode selector 44 will always select the mode of operation of bridge 48 to provide proper amplitude and direction of motor current.

Figure 5:
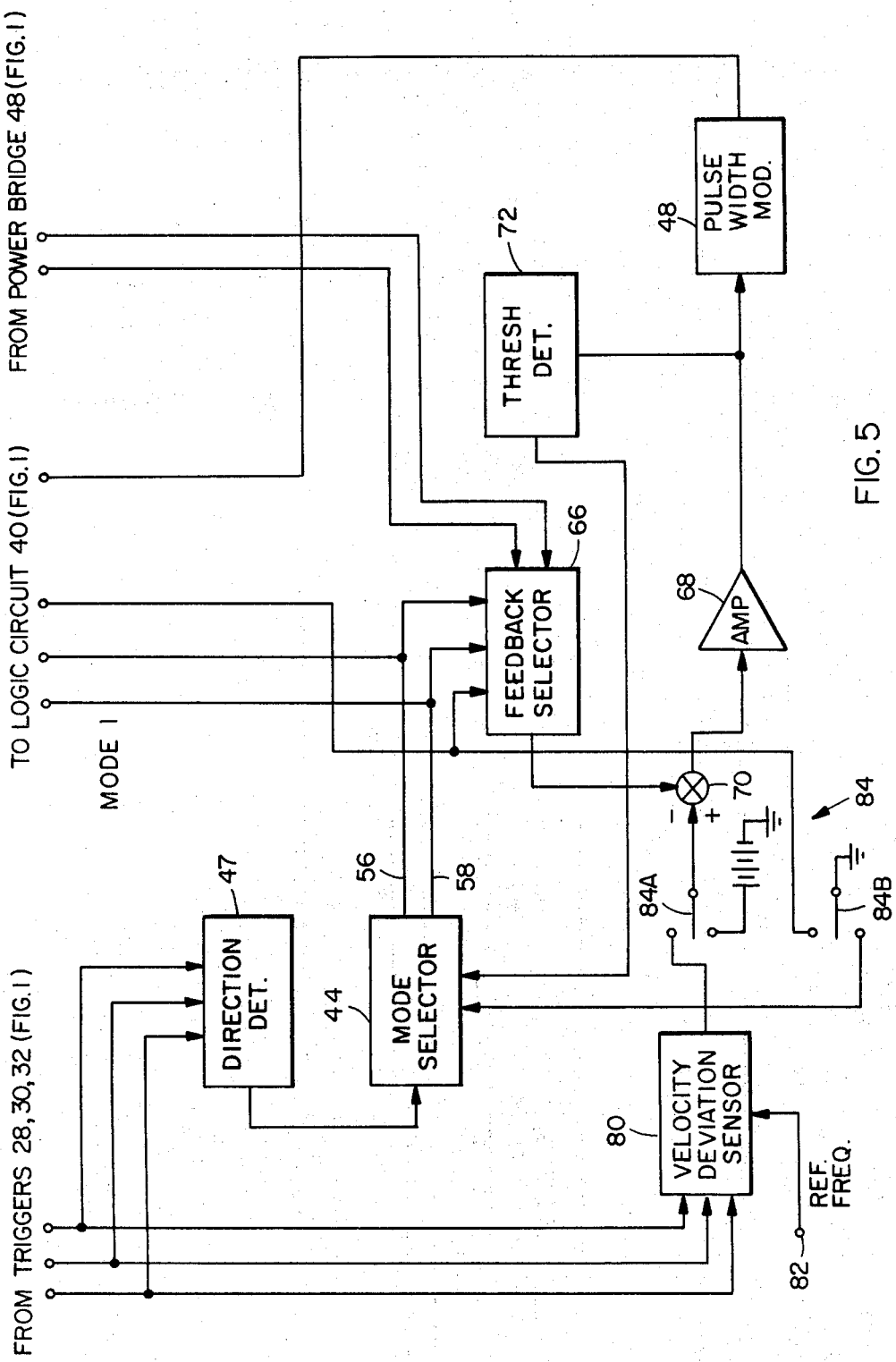
FIG. 5 is an electrical schematic-diagram showing means for controlling the motor in a constant speed mode.

FIG. 5 shows the constant speed system embodiment of the invention. A velocity deviation sensor 80 compares the frequency of the signals from triggers 28, 30 and 32 (FIG. 1) with that of an accurate, stable reference frequency 82 and when a trigger frequency is below the reference the output of the velocity sensor 80 is at a "high." This high output is directed through a manually or automatically operated closed accelerate-decelerate switch 84 i.e. contact 84A connecting sensor 80 to summing means 70 and summed thereat with the output from feedback selector 66. The output from summing means 70 is applied to amplifier 68 as heretofore noted with reference to FIG. 1. In this way motor run-up occurs until the motor speed slightly exceeds the speed commanded by reference frequency 82, and at which time the output of velocity sensor 80 drops rapidly but linearly. This cuts back power with speed, and the speed stabilizes at some point on a steep torque v. speed line.

If deceleration is required, switch 84 is actuated to the deceleration position, i.e., contact 84B connected to feedback selector 66 and logic circuit 40, to command a reverse direction of current. As long as back EMF is sufficiently high the braking power will come from the inertia load itself. When the speed and back EMF can no longer maintain the commanded current, threshold detector 72 will detect this, and affects signal mode selector 44 to change from mode 4 to mode 3. This "plugging" operation will continue until zero speed, and at which time direction detector 47 will sense that the load is stopped and is just beginning to be reversed. The detector will then disable the system through mode selector 44 until the switch position is again change. In regenerative braking a bi-lateral power source, that is, one which may give or receive electrical energy must be used. This requirement is usually met by the use of storage batteries.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A brushless direct current motor including motor driving means, comprising:

first, second and third position sensors for sensing the position of the motor armature, and each of said sensors providing an alternating signal;

first, second and third trigger means connected to the first, second and third position sensors, respectively, and each of said triggers providing an alternating signal when the alternating signal from the respective position sensor is zero;

commutation circuitry connected to the first, second and third triggers and responsive to the signals therefrom for providing a plurality of commutating signals;

a power bridge connected to the commutation circuitry and responsive to the plurality of signals therefrom for driving the motor;

means responsive to a torque command signal for providing a signal corresponding to the absolute value of the signal;

a feedback circuit connected to the power bridge and responsive to signals therefrom for providing selected feedback signals;

means connected to the absolute value signal means and to the feedback circuit for combining the signals therefrom;

means connected to the combining means and responsive to the combined signal for providing a corresponding pulse output; and the last mentioned means connected to the commutation circuit, with the pulse output affecting the commutation circuit to control the effective amplitude of the motor driving signals from the power bridge.

2. A motor as described by claim 1 including:

means responsive to the torque command signal for providing a signal at one level when the torque command signal is in one sense and for providing a signal at another level when the torque command signal is in an opposite sense;

a threshold detector connected to the combining means and responsive to the signal therefrom for providing a threshold signal;

a directional detector connected to the triggers for sensing the sense of the signals therefrom;

a power supply connected to the power bridge;

a mode selector connected to the threshold detector, the directional detector and the means for providing signals at the one and another levels, and responsive to the signals therefrom for providing mode control signals; and the commutating circuit connected to the mode selector and responsive to the mode control signals therefrom for affecting the power bridge to control direction of current to the motor, and to control the sense of the motor speed.

3. A motor as described by claim 2, wherein:

the feedback circuit is connected to the mode selector and responsive to the signals therefrom for selectively providing a feedback signal in accordance with the direction of motor current and the sense of the motor speed 4. A motor as described by claim 1, including:

means for providing a signal at a reference frequency;

means connected to the first, second and third triggers and to the reference signal means for comparing the signals therefrom and for providing an output at a predetermined level when the frequency of one of the trigger signals is below the reference frequency; and switching means connecting the comparing means to the combining means for stabilizing motor speed.

5. A motor as described by claim 1, wherein:

the position sensors are Hall Generators spaced 120 electrical degrees apart in magnetic flux sensing relation to a rotor coupled to the motor armature and rotating therewith; and
the Hall Generators provide three out-of-phase sinusoidal signals.

6. A motor as described by claim 5, wherein:
the triggers provide three square wave signals having the same phase, respectively, as the sinusoidal signals from the Hall Generators.

7. A motor as described by claim 6, wherein:
the plurality of commutation signals includes six signals, each 120° wide and overlapping by 60°.

8. A motor as described by claim 1, wherein
the motor is a three wire motor; and
the bridge is a three phase bridge.

9. A motor as described by claim 1, wherein the power bridge includes:
a plurality of current flow control devices corresponding to the plurality of commutating signals, each of the current flow control devices receiving one of the signals, said current flow control devices arranged in parallel pairs;
a power supply connected to at least one of the current flow control devices in each of the pairs; and
a pair of diodes arranged with each pair of current flow control devices for providing a path for motor current to flow to and from the power supply.

* * * * *